United States Patent

Hargreaves

[15] 3,667,288
[45] June 6, 1972

[54] TENSILE TESTING MACHINE

[72] Inventor: John E. Hargreaves, 188 Woodbine Terrace, Spartanburg, S.C. 29301

[22] Filed: Mar. 2, 1970

[21] Appl. No.: 15,367

[52] U.S. Cl..................................................73/98, 73/97
[51] Int. Cl.........................................G01n 3/14, G01n 3/10
[58] Field of Search...................73/95, 95.5, 97, 98, 89, 90; 92/9

[56] References Cited

UNITED STATES PATENTS

| | | | |
|---|---|---|---|
| 1,878,192 | 9/1932 | Scott | 73/98 |
| 3,407,651 | 10/1968 | Sophy | 73/97 |
| 2,217,080 | 10/1940 | Ruch | 73/95 |
| 1,184,034 | 5/1916 | Scott | 73/98 |
| 940,482 | 11/1909 | Scott | 73/98 |
| 3,499,321 | 3/1970 | Baker | 73/95.5 |
| 662,327 | 11/1900 | Veemilye | 73/95 |
| 3,476,266 | 11/1969 | Devol | 92/9 X |
| 3,315,768 | 4/1967 | Stuhler et al. | 92/9 X |
| 3,176,801 | 4/1965 | Huff | 92/9 X |
| 2,891,514 | 6/1959 | Moeller | 92/9 X |
| 2,533,625 | 12/1950 | Martin | 73/97 |
| 2,457,286 | 12/1948 | Tollefsen et al. | 116/129 B |
| 1,464,772 | 8/1923 | Paine | 116/129 B |

FOREIGN PATENTS OR APPLICATIONS

| | | | |
|---|---|---|---|
| 193,117 | 9/1937 | Switzerland | 116/129 B |
| 255,835 | 9/1926 | Great Britain | 116/129 B |

Primary Examiner—Richard C. Queisser
Assistant Examiner—Marvin Smollar
Attorney—Wellington M. Manning, Jr.

[57] ABSTRACT

A machine for testing the strength of a filament, yarn, fabric, etc specimen by securing said specimen between two clamps and applying a controlled amount of force to one of said clamps while resisting said force with a pivotably mounted lever arm having a predetermined amount of weight positioned thereon. The machine of the present invention has a rotatably mounted shaft from which is suspended a weighted lever arm, said shaft being connected to a first specimen holding means by means of a chain that is secured to a drum mounted on the shaft. The shaft further has an anti-backlash gear mounted thereon, said gear being operatively associated with a second gear mounted on a second shaft. Said second shaft being journaled for rotation in one direction only, having a one way clutch associated therewith. Said second shaft has mounted to an outer end thereof a rotatable dial which is calibrated to indicate the amount of force applied to the specimen. The dial itself rotates while a pointer remains stationary. The controlled amount of force is applied to a second specimen holding means and is generated by a hydraulic cylinder or a combination hydraulic cylinder and air cylinder. The weight lever arm has positioned proximate thereto an electromagnet which, before application of the controlled amount of force to the specimen, remains energized to prevent movement of the lever arm during securing of the specimen to the specimen holding means.

13 Claims, 8 Drawing Figures

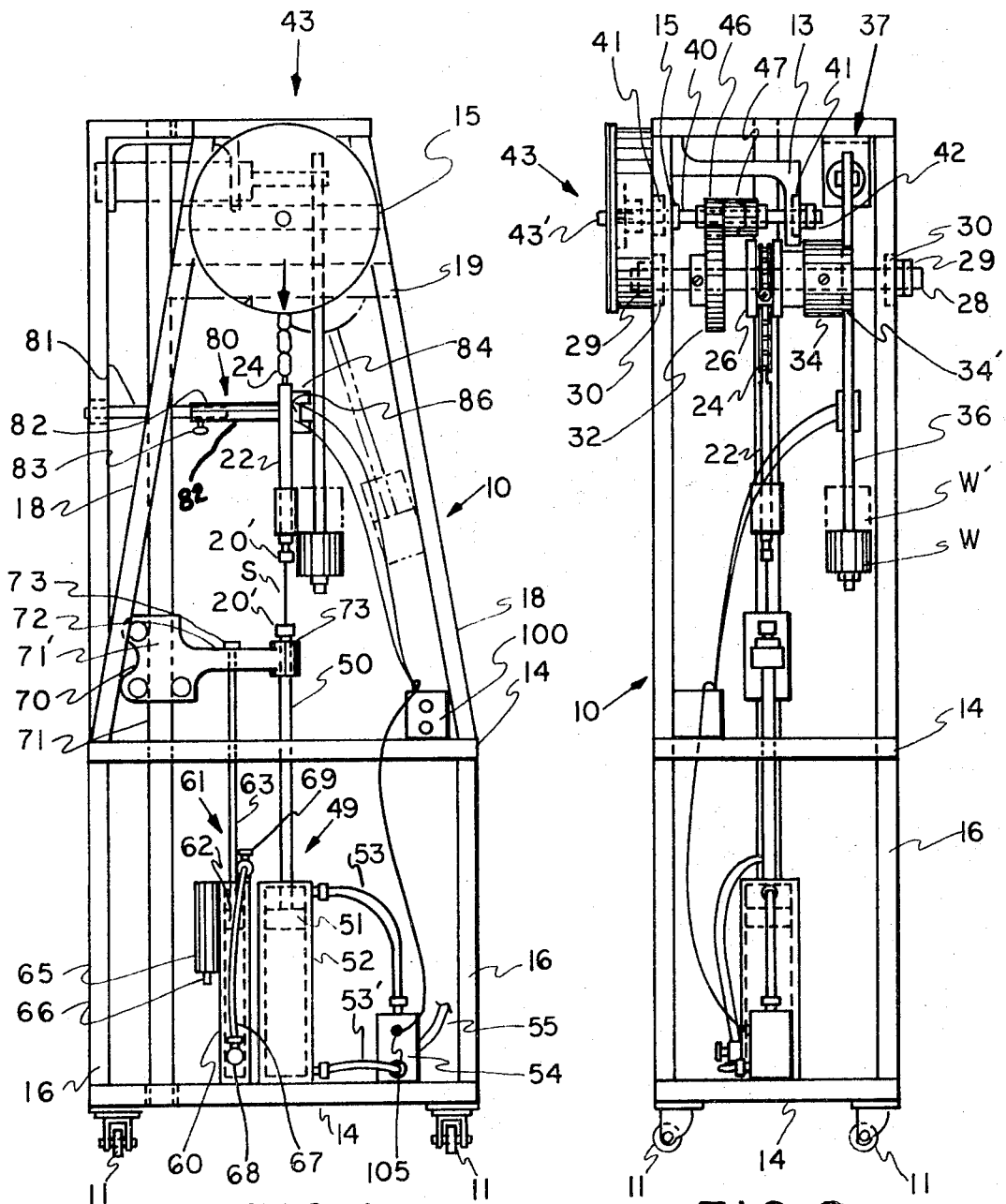

INVENTOR.
JOHN E. HARGREAVES
ATTORNEY

PATENTED JUN 6 1972 3,667,288

INVENTOR.
BY JOHN E. HARGREAVES
ATTORNEY

TENSILE TESTING MACHINE

BACKGROUND OF THE INVENTION

Testers for textiles and other materials are in general very old in the art. All materials that are manufactured require some degree of testing so as to maintain good quality control standards therefor. Among the investigations conducted on these materials, the tensile strength of samples of the material is investigated so as to determine the amount of force that the material will accept under the breaking point. Additionally, samples are often tested by applying a force to a material, releasing the force, and repeating the cycle for a specific number of times to determine various and sundry properties of the material having to do with the tensile strength or elongation properties of the material.

Apparatus for conducting the strength of materials must meet certain standards for commercial acceptance. Of these, the apparatus must be accurate, capable of rendering good reproducible results, must be sufficiently sturdy to withstand the everyday riggers of handling by operating personnel, must be economically attractive and the like.

As the various industries have become more and more sophisticated, testing societies have been established through which standardized tests have been developed. Such standardized tests permit all manufacturers to test their individual materials by the procedures of the tests whereby comparative results between the separate materials of different manufacturers are meaningful. Further, increases in the size of the textile industry, for example, have brought about situations where competitive materials may be purchased at competitive prices. Hence, a tremendous amount of emphasis is placed on maintenance of good quality control of each particular product so as to enable the manufacturer thereof to market his product at a competitive price with that of his competitor, while at the same time being able to offer a better quality product. Moreover, in the majority of industries, the quality of a particular product determines the selling price at which the product may be successfully marketed. It is important therefore, to continually monitor the physical characteristics of the material to insure continued production of first quality materials. Often times, a small facet of a process deteriorates to the point that off-quality products are produced. If this bad quality product is allowed to be produced undetected, first quality output of the production plant is obviously decreased. Continuous monitoring of quality is thus tantamount to plant efficiency and profits.

Emphasis has continuously remained on improvement of quality control methods and on test machines for conducting the improved test procedures. Materials may thus be tested faster, tested with greater reproducibility of results, tested more conveniently, and tested more cheaply. All of the factors must be taken into consideration by one manufacturing and marketing testing equipment. Originally, the test machines were fairly standard and were very simple in the sense of the technology of today. During the evolution of the present day machines, various manufacturers of test equipment have branched off into particular individual directions. These manufacturers claim equipment superiority due to certain particular characteristics of their individual machines, whereby a sales tool is provided. At the same time, the machine is, in fact, an advance in the art and attributes some improvement to testing, per se, or the test results attained thereby.

The testing machine of the present invention is such a machine. The present testing machine, while accomplishing the same general result of the test machines of 20 or 30 years ago, utilizes a different and more advantageous arrangement for testing the specimen. For instance, the test machine itself is semi-portable, thus enabling a purchaser of the machine to position or move the machine as desired in its test facility. Secondly, the apparatus of the present machine is such that better controlled results may be obtained than with other machines presently on the market. Further, the test data obtained from the use of the present machine is always read at a single location that is not influenced by the physical location of the operator.

As mentioned earlier, strength testing machines are very old in the prior art and various and sundry machines have been developed to test textile and related materials; the emphasis on these machines being directed to certain improved features above the basic test apparatus. Exemplary of the prior art related to testing machines of general pertinence to the present testing machine are Lawson, U.S. Pat. No. 2,634,607; Dart et al., U.S. Pat. No. 2,724,264; LaTorre, U.S. Pat. No. 2,567,217; Scott, U.S. Pat. No. 1,512,491; Scott, U.S. Pat. No. 940,482; Scott, U.S. Pat. No. 1,372,093; Scott, U.S. Pat. No. 2,037,273, and Scott, U.S. Pat. No. 1,219,594. The above identified patents are felt to be pertinent to the subject matter of the present invention, but at the same time are not believed to teach, either alone or in combination, or to render obvious to one skilled in the art, the testing machine of the present invention.

SUMMARY OF THE INVENTION

It is an object of the present invention to provide an improved machine for testing specimens so as to determine the tensile strength or other physical characteristics thereof.

It is another object of the present invention to provide an improved testing apparatus having controllable and adjustable force applicator means.

A further object of the present invention is to provide testing apparatus having improved test result indicator means.

Still further, another object of the present invention is to provide a testing apparatus capable of producing more reliable results during testing of the strength of materials.

Generally speaking, the testing machine of the present invention comprises specimen holding means; controllable force applicator means operatively associated with said specimen holding means; variably weighted shaft means operatively associated with said specimen holding means so as to rotate thereby an amount proportional to an controlled force applied to said specimen holding means having a specimen held thereby; and rotatable force indicator means operatively associated with said shaft means so as to be rotated thereby in one direction only, said indicator means having stationary pointer means associated therewith to indicate the amount of force applied.

In line with the dictates of standardized test procedures the test machine of the present invention can be adapted to apply a predetermined amount of force to a test specimen at a predetermined rate of time. The system for applying the predetermined amounts of force at predetermined time rates may be an air system that is controlled by a small hydraulic system or may be a fully hydraulic system. Use of either the small or large hydraulic system permits not only the application of force in a controlled manner, but may also be double acting so as to be reversable to enable, for example, the determination of a hysterisis curve for a particular specimen. The force may be applied and released, and this cycle repeated for a predetermined number of times with the test data being recorded to produce the sailient points of the hysterisis curve. The combined air-hydraulic system is not necessary as mentioned above and may be replaced with a fully hydraulic system. The combination air-hydraulic system is, however, employed when economics are to be considered.

A recording system is located on the end of the test machine opposite the power applicator system. Normally test machines have been equipped with stationary dial faces and movable indicators for obtaining the test results from the apparatus. In such an arrangement, it is difficult to accurately read the indication on the dial at all positions around the face of the dial consistently. Hence, an operator of a certain height may, when the indicator is in various positions around the face of the dial, extract readings from the dial that are inaccurate due to the particular position of the indicator with respect to the observer's eyes. The present testing machine has eliminated this possibility by providing a stationary pointer at a fixed location and a movable dial such that the operator always views the indicator from the same position while the particular test reading will be moved under the indicator. Moreover, the apparatus is arranged in such a manner that once the optimum reading is set on the dial, this reading will not be changed regardless of the condition of the machine until the operator so desires.

In using a testing machine such as is taught herein, it is important that when mounting the specimen between the specimen holding means, that erroneous readings are not introduced due to force applied to the sample as it is being installed. The testing machine of the present invention is thus equipped with means to prevent erroneous movement of the test apparatus during mounting of the specimen in the specimen holding means.

BRIEF DESCRIPTION OF THE DRAWINGS

FIG. 1 is a front elevation of the testing machine of the present invention.

FIG. 2 is a side elevation of the testing machine of the present invention.

DESCRIPTION OF THE PREFERRED EMBODIMENTS

Figure 3:
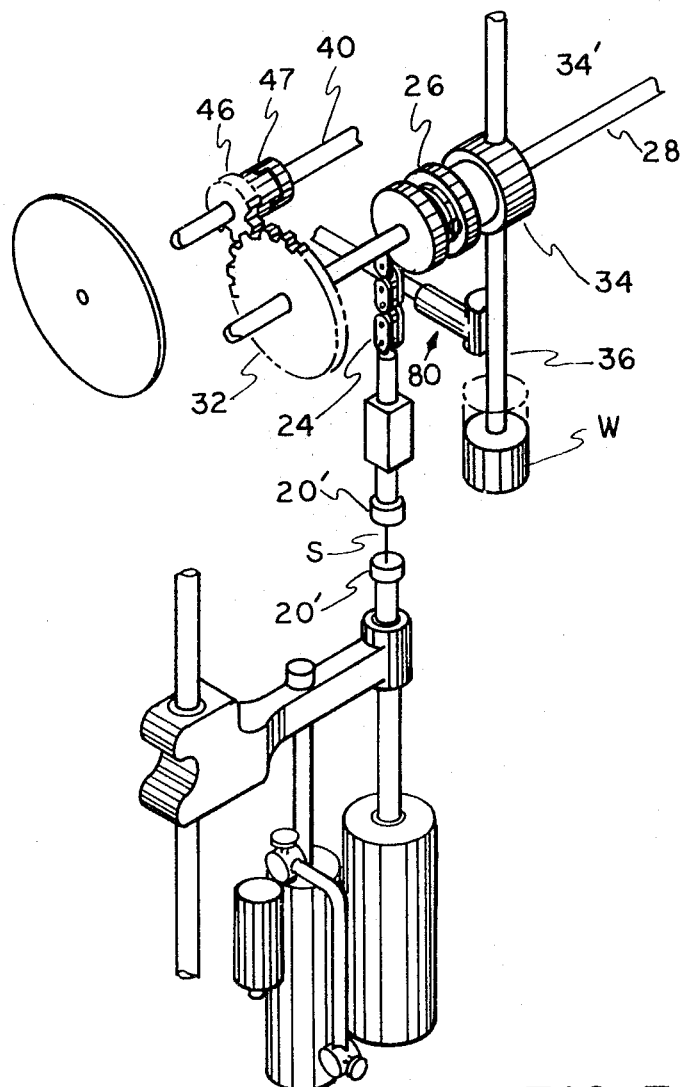
FIG. 3 is an isometric view of the operative elements of the testing machine of the present invention.

Referring to the Figures, the testing machine of the present invention will now be described. The operative components of the instant testing machine are housed within and supported by suitable framework generally indicated as 10. Framework 10 comprises a base section comprising a series of horizontal support members 14 and a series of vertical support members 16. Angular support members 18 extend upwardly from the base section of framework 10 to accommodate operative elements of the upper section of the testing machine.

The testing machine in general may be further supported by any suitable means, such as for example casters or wheels 11 that are shown to be affixed to frame 10 at the corners where the lower horizontal members 14 join. It is not, however, necessary that the testing machine be mounted in a frame such as is illustrated in the Figures. Instead, if desired, the test apparatus might be suitably mounted on a table, work bench, a wall, or the like. For the sake of mobility, however, the illustrated arrangement is preferred.

The testing machine of the present invention is designed to accommodate test specimen of textile materials such as for example monofilaments, bundles of fibers or filaments, yarns, fabrics, and the like. With minor modification, however, other types of materials could be tested by the test machine of the present invention. Test specimen S is held by specimen holding means 20 during testing thereof. Specimen holding means 20 is suitably two clamping members 20', the construction of which does not, per se, form a part of the present invention since any suitable specimen holding means may be employed so long as the specimen S that is to be evaluated is securely held during testing. Upper clamp 20' is connected to and suspended from a vertically oriented rod member 22. Rod 22, at its end opposite to the clamping member 20' is connected to a link chain 24 or other suitable flexible member. Chain 24 is, in turn, secured to a drum 26 that is mounted on a shaft 28.

Figure 4:
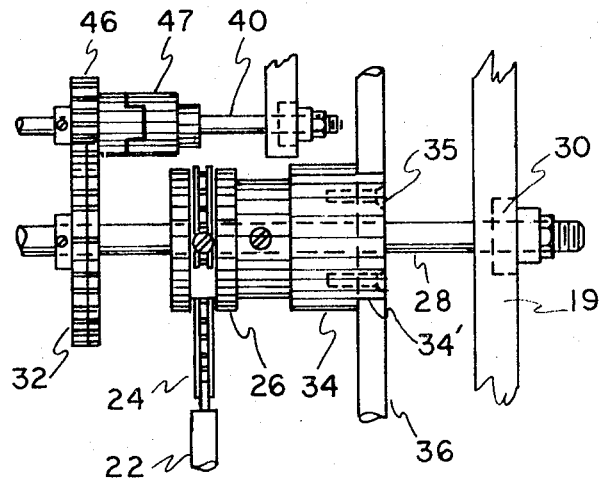
FIG. 4 is a blown-up view of the shaft system of the present invention as shown in FIG. 2.

Shaft 28 is rotatably journaled to framework 10 as shown in FIG. 2. Shaft 28 extends through support members 19 and is secured in position by means of lock nuts 29 or other suitable fastening members. Support members 19 are counterbored to receive a bearing 30. Bearing 30 is housed in support members 19 and receives shaft 28 so as to provide a bearing surface on which shaft 28 may properly rotate. As may be best seen in FIGS. 2 through 4, shaft 28 as mounted thereon a drum 26 to which chain 24 is firmly secured; an anti-backlash spur gear 32 and a yoke 34. Yoke 34 is notched out at 34' across one end thereof to receive a weight lever 36 which is rigidly secured thereto by screws 35 or other suitable means. Weight lever 36 extends above and below yoke 34 and is adapted to receive weights W on either end, the purpose of which will be explained hereinafter. For example a weight W is shown positioned on the lower end of weight lever 36 with a phantom outline of a further possible weight W' positioned thereabove. The operation and functions of the weights with regard to the weight lever and operation of the testing machine will be described hereinafter.

Figure 7:
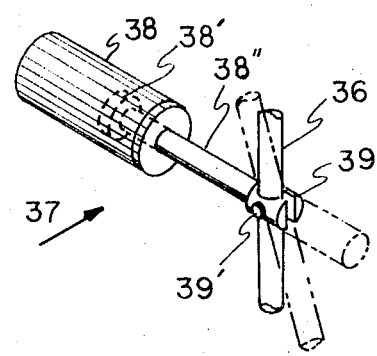
FIG. 7 is an isometric blown-up view of the weight lever return control means as shown in FIG. 1.
Figure 5:
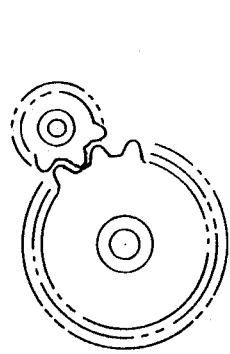
FIG. 5 is an end view of the gearing relationship of the present invention.

Weight lever 36, under normal circumstances, would rapidly return to its zero position upon breaking of the test specimen S. Such a rapid return could possibly cause damage to the test equipment. The test machine of the present invention is thus equipped with weight lever return means 37 to combat too rapid a return of weight lever 36 to the zero position. Weight lever return means 37 is secured to frame 10 at one end and associated with the uppermost end of weight lever 36 at an opposite end to control the return of weight lever 36 to the zero position in a fashion such that the test equipment will in no way be damaged or affected. Weight lever return means 37 is illustrated in FIGS. 1 and 7 and comprises an air cylinder 38 having a piston 38' and rod 38" slidably received therein. Rod 38" is in turn removably attached to weight lever 36 by a collar 39 located at the outer end or rod 38". Collar 39 has a set screw 39' therein to secure rod 38" to weight lever 36. Operation of the weight lever return means 37 will be described hereinafter.

A second shaft 40 is positioned above shaft 28 and is supported by frame support members 13 and 15. Shaft 40 is journaled for rotation in frame members 13 and 15, having bearings 41 residing in counterbores therein to facilitate proper shaft rotation. Shaft 40 terminates beyond frame member 13 at one end and is secured in place by a lock nut 42 or other suitable means. The opposite end of shaft 40 extends through frame member 15 and is operatively associated with test result indicator means generally indicated as 43. Test results produced during operation of the testing machine of the present invention are recorded on and read directly from indicator means 43. Shaft 40 is operatively associated with shaft 28 through a pinion gear 46 rotatably mounted on shaft 40 and in meshing relation with gear 32 on shaft 28. Adjacent pinion gear 46 is associated therewith is a one way clutch means 47 that is also mounted on shaft 40. The relative sizes of spur gear 32 and pinion gear 46 determines the degree of rotation of shaft 40 that is produced relative to rotation of shaft 28. One way clutch 47, however, permits shaft 40 to rotate as force is being applied to test specimen S, but precludes a reverse rotation to shaft 40 after specimen S breaks and weight lever 36 returns to the zero position. Accordingly, as shaft 40 rotates during the application of force to specimen S, a component of indicator means 43 likewise rotates to properly reflect the amount of force being applied. Once specimen S breaks pinion gear 46 continues to rotate but one way clutch 47 becomes disengaged and prevents a reverse rotation to shaft 40. The maximum amount of force applied and registered on the indicator means 43 thus remains on indicator means 43 and is readable at the will of the operator.

Figure 6:
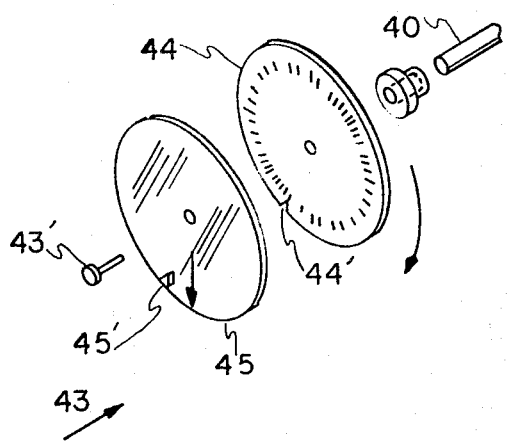
FIG. 6 is an exploded isometric view of the indicator means of the present invention.

As mentioned above, test result indicator means 43 is attached to one end of shaft 40. Indicator means 43 comprises a dial face 44 secured to shaft 40 for rotation therewith (See FIG. 6). Dial 44 has indicia inscribed thereon corresponding to units of the force that is to be applied to a specimen S. In the event that substantially different amounts of force are required for a particular test and weights are added on weight lever 36 to correspond to the predetermined ranges, dial 44 can be provided with plural scales, each scale corresponding to a particular force range. Further, to aid in reading the amount of force applied and ergo, the strength of the test specimen, each scale on dial 44 may be painted a different color with each color corresponding to the color of the particular weights being applied. Utilizing corresponding colors for weights on weight lever 36 and scales on dial 44, reduces the chance of error by the machine operator in reading the correct scale. Dial 44 thus turns with shaft 40 while a pointer 45 is positioned immediately in front of dial 44 and is stationary to permit standardized reading of the test results from a common location. Hence, regardless of the amount of force applied, indicator means 43 are always read from the same location. For test machines where the pointer moves and the dial is stationary, error is easily introduced into the readings due to different positions of the pointer with respect to the operator's eyes. Pointer 45 is illustrated in FIG. 6 to be a plate having the pointer element inscribed thereon. It should be understood, however, that pointer 45 could be a member secured in front of dial 44 or other suitable reference means for reading indicated results from dial 44.

After the test results have been read from indicator means 43, it then becomes necessary to reset dial 44 to a zero reading. A knob 43' extending outwardly from indicator means 43 and secured to dial 44 may be turned to manually rotate dial 44. Since shaft 40 only rotates in one direction, dial 44 must be zeroed during the first revolution or else it must be given additional turns until the zero position is mated with pointer 45. A notch 44' in the edge of dial 44 mates with a protrusion 45' on the pointer plate 45. Hence rotation of dial 44 occurs until notch 44' mates with protrusion 45'. At the point of mating, the dial 44 is again zeroed and is ready for further testing.

Lower clamping member 20' of the specimen holding means 20 is attached to the upper end of a rod 50 that extends from within a cylinder 52. Cylinder 52 may be one of several types of cylinders that are used to produce a force that is applied to the specimen S being tested. For example, as shown in FIG. 1, cylinder 52 is an air cylinder having a piston and rod assembly 49 slidably mounted therein. Piston and rod assembly 49 comprise piston rod 50 and piston 51. Cylinder 52 is also provided with air tubes 53 and 53' respectively which are in turn connected to a control system 54 through which air is supplied by line 55 from an air source not shown. Adjacent air cylinder 52 and operatively associated therewith is a hydraulic cylinder 60 that is used to control the speed at which piston and rod assembly 49 move into cylinder 52.

Hydraulic cylinder 60, like air cylinder 52 contains a piston and rod assembly 61 which comprises a piston 62 and a piston rod 63. Hydraulic cylinder 60 acts as a resist for air cylinder 52 to permit close control of the speed of which piston rod 50 and piston 51 move downwardly into cylinder 52, during the application of force to specimen S. In order to control the downward speed of piston and rod assembly 49, hydraulic cylinder 60 is interconnected with air cylinder 52 at bracket 70. Bracket 70 is slidably mounted on a support rod 71 and comprises a support rod engaging section 71' having an arm 72 extending outwardly therefrom. Piston rods 50 and 61 extend through arm 72 of bracket 70 and are locked into position by suitable fastening means 73 on the upper side thereof. Piston rod 50 of air cylinder 52, however, extends onwardly above arm 72 of bracket 70 where it is attached to lower clamping member 20'.

Hydraulic cylinder 60 has a fluid collecting pot 65 in direct communication therewith for receiving hydraulic fluid that is displaced from cylinder 60 during downward movement of piston and rod assembly 61. Pot 65 has slidably mounted a rod 66 that moves out of pot 65 as fluid is entering and into pot 65 as fluid is leaving. Additionally, hydraulic cylinder 60 is equipped with means to adjust the speed at which piston assembly 61 moves downwardly or upwardly through cylinder 60. Such speed adjustment means comprises a by-pass line 67 connecting the lower end of cylinder 60 with the upper end around piston 62. Line 67 is equipped with an adjustable valve 68 at the lower connection to cylinder 60 and an adjustable valve 69 at the upper connection to cylinder 60. Under normal circumstances, as piston assembly 61 moves through cylinder 60, hydraulic fluid is displaced around piston 62. Speed of movement of piston assembly 61 through cylinder 60 may, however, be controllably increased in either direction by adjusting valve 68 or 69 to permit a predetermined amount of hydraulic fluid to by-pass piston 62 through line 67. Hence when a specific test requires a certain rate of force application, adjustment of valve 68 or valve 69 will permit the prescribed rate of force to specimen S to be realized.

Figure 8:
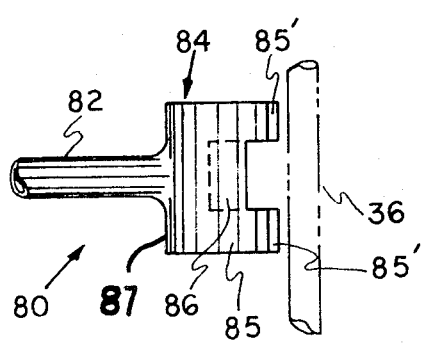
FIG. 8 is a blown-up view of the weight lever stop and holding means of the present invention.

Referring to FIGS. 1, 2, 3 and 7 it may be seen that the weight lever 36 is mounted on shaft 28 at yoke 34. It is desirable during operation of the instant testing machine that the weight lever 36 not move prematurely and also that weight lever 36 not return in a drastic manner to its original position. To accomplish these features, a stop means 80 is mounted on framework 10 adjacent weight lever 36. Stop means 80 as best seen in FIG. 8 comprises a rod 81 mounted to member 18 of frame 10. A second rod 82 telescopes over rod 81 and is adjustably secured thereto by a set screw 83 or other suitable means. Rod 82 has at an opposite end thereof, adjacent weight lever 36, a U-shaped stop 84 for stopping and holding weight lever 36 as desired. Each end of legs 85 of stop 84 is provided with a resilient member 85' so as to cushion any blow received by contact with weight lever 36. Further, a suitable holding means 86, such as for example, an electromagnet is located in the base 87 of the stop 84. Weight lever 36 does not make contact with holding means 86 as shown in the figures, but while weight lever 36 is in the zero position, it is under the influence of the electromagnetic field produced during energization of holding means 86. Holding means 86 is energized during the test cycle when power is supplied to the test machine and while force is not being applied to specimen S. Such an arrangement is accomplished through control means for the machine. Hence, so long as rods 50 and 63 are in the extended position out of cylinders 52 and 60 respectively, power is supplied to holding means 86 and the electromagnetic field is produced to hold weight lever 36. When, however, control box 100 is operated by pushing the appropriate button, switch, or the like to actuate the force producing means, power to holding means 86 is terminated and weight lever 36 is free to move proportionately to the amount of force applied to specimen S.

During the return of weight lever 36, weight lever return means 37 act on the upper end of lever 36 to retard drastic return thereof. Likewise, at the lower end of weight lever 36, stop 84 of stop means 80 is provided with resilient members 85' to cushion the stopping of weight lever 36. Weight lever 36 will seek a natural zero position during inactivity of the testing machine. The zero position will, however, vary depending upon the weight on weight lever 36. Accordingly, stop means 80 is adjustable to permit readjustment to the zero position. Adjustment of stop means 80 may be accomplished by loosening of set screw 83 and moving rod 82 along rod 81 to the desired new location retightening set screw 83.

Now that the apparatus of the testing machine of the present invention has been described, the operation of the machine should be explained so as to facilitate a better understanding of the invention. While rods 50 and 63 of the force applicator means are extended, a test specimen S is secured between upper specimen holding means 20' and lower specimen holding means 20'. At this stage of the testing, indicator means 43 reads zero force and electromagnet 86 is energized so as to prevent a premature movement of weight lever 36. Depending upon the type of specimen being tested, a predetermined amount of weight is placed on weight lever 36 such as might be indicated by weights W and W'. To coordinate the indicator means with the amount of weight being used during a particular test run, dial 44 of indicator means 43 is, as previously mentioned, provided with a plurality of color coded scales around the face thereof.

The operator now depresses the start button at signal box 100. Depression of the start button at signal box 100 accomplishes a plurality of feats. The control system associated with the testing machine of the present invention is not shown in detail since the arrangement thereof would be obvious to one skilled in the art. Operations of the controls, however, accomplishes deenergizing of the electromagnet 86 simultaneously with energizing of a solenoid switch 105 to open same and pass air from supply line 55 through line 53 into air cylinder 52 above piston 51 so as to force piston 51 downwardly into cylinder 52. As piston 51 moves downwardly, piston rod 50 and hydraulic piston rod 63 are likewise pulled downwardly as is bracket 70 which slides downwardly on rod 71. Hydraulic cylinder 60 has been adjusted so as to permit the predetermined speed of movement, whereby, the amount of force applied to specimen S may be regulated in a controlled manner. Hence, as rods 50 and 63 move downwardly, force is applied to test specimen S and is transmitted through test specimen S, rod 22 and chain 24 to drum 26. The downward pull transmitted through rod 22 and chain 24 to drum 26 causes chain 24 to unwind from around drum 26 whereby, a rotational motion is imparted to shaft 28. As shaft 28 rotates, weight lever 36 which is attached to yoke 34 begins an arcuate movement to the right as shown in phantom in FIG. 1. The amount of movement of weight lever 36 is dependent upon the amount of force applied to specimen S and also the resistance to the force as is represented by the weight W that is applied to the lower end of weight lever 36. Weight lever 36 thus, depending upon the amount of weight suspended thereon, resists the rotational movement of shaft 28 until the amount of force applied is sufficient to overcome the amount of weight suspended thereon. When the suspended weight is overcome, shaft 28 rotates.

Rotation of shaft 28, thus produces rotation of spur gear 32 which is securely mounted on shaft 28 and since pinion gear 46 is in meshing relationship with spur gear 32, pinion gear 46 likewise rotates a proportionate amount. The degree of rotation of pinion gear 46 is determined by the relative size of pinion gear 46 to spur gear 32. Further, as pinion gear 46 rotates, one way clutch 47 engages and causes shaft 40 to rotate therewith. As mentioned earlier, indicator means 43 are mounted on one end of shaft 40. Thus as shaft 40 rotates, dial 44 of indicator means 43 likewise rotates past the fixed pointer means 45, whereby, the amount of force applied to specimen S is indicated on dial 44 under pointer means 45 and may be conveniently read therefrom.

The downward movement of rods 50 and 63 may continue to the point of breaking of specimen S. When specimen S breaks, the transmission of force through specimen S to shafts 28 and 40 ceases. Once the force on shaft 28 ceases, weight lever 36 then begins its return to its original or zero position. Shaft 28 now begins to rotate with the arcuate movement of weight lever 36 in a direction opposite to the direction of rotation during force application. The opposite rotation of shaft 28 thus causes chain 24 to again wrap around drum 26 and causes spur gear 32 to rotate in an opposite direction. As spur gear 32 rotates in the opposite direction, pinion gear 46 likewise rotates in an opposite direction. Since, however, clutch 47 is a one way clutch, as pinion gear 46 rotates in the opposite direction clutch 47 disengages and shaft 40 will not rotate, thus allowing dial 44 of indicator means 43 to remain in the position that it assumed when the specimen broke, and indicating the highest unit of force applied to the specimen. The operator can then read the amount of force directly from dial 44 at a point immediately beneath fixed pointer 45. After the operator has read the amount of force applied, he must then reset the dial so as to ready the machine for the next test operation. Resetting of the dial is readily accomplished by manual rotation of the dial through twisting of knob 43' to rotate dial 44 to the point where notch 44' engages and mates with protrusion 45' of pointer 45. The return of weight lever 36 to the zero position is controlled by weight lever control means 37 to avoid a too rapid return that would be produced by the weights W and W' suspended from weight lever 36.

Piston 38' is housed in cylinder 38 attached to weight lever 36 through piston rod 38'' and yoke 39. Thus, the return of lever 36 is slowed down to the speed at which piston 38' moves through cylinder 38.

Having described the invention, it is apparent that one having an ordinary amount of skill in the art may arrive at various adaptations and modifications to the invention without departing from the scope of the invention. The scope of the invention should therefore be governed by the claims appended hereto.

What is claimed is:

1. A tensile testing machine comprising:
    a. a pair of specimen holding means;
    b. a force applicator means operatively associated with one of said specimen holding means, said force applicator means comprising a fluid cylinder having a piston and rod assembly slidably received therein and movable upon application of a force to transmit said force to a specimen being held between said specimen holding means;
    c. rate control means for said force applicator means, said rate control means comprising a second cylinder having a second piston and rod assembly slidably received therein, said second piston and rod assembly being operatively associated with said first piston and rod assembly and said second cylinder being preset to permit a predetermined rate of movement of said second piston and rod assembly therethrough, whereby said first piston and rod assembly apply force to said specimen at a like rate;
    d. weighted pendulum shaft means operatively associated with said other of said specimen holding means so as to be rotated thereby an amount proportional to a force applied to said specimen; and
    e. rotatable force indicator means operatively associated with said weighted pendulum shaft means so as to be rotated thereby.

2. A tensile testing machine as defined in claim 1 wherein said first cylinder is an air cylinder and said second cylinder is a hydraulic cylinder.

3. A tensile testing machine as defined in claim 2 wherein said rods of said air and hydraulic cylinders are secured to a slidable bracket and said air cylinder rod is further secured to said specimen holding means.

4. A tensile testing machine as defined in claim 2 wherein said hydraulic cylinder has attached thereto and in communication therewith a pot, said pot having volume adjustment means integral therewith.

5. A tensile testing machine as defined in claim 1 wherein the weighted pendulum shaft means comprises a shaft journaled for rotation, said shaft having mounted thereon a drum, a gear and a yoke, said drum being associated with said specimen holding means and said yoke having attached thereto a weight lever.

6. A tensile testing machine as defined in claim 5 wherein said drum on said shaft has attached thereto and extending partially therearound a chain, said chain at an end opposite to said drum being associated with said specimen holding means.

7. A tensile testing machine as defined in claim 5 wherein lever arm has a weight thereon at a first end and is attached to a weight lever return means at an opposite end beyond said yoke.

8. A tensile testing machine as defined in claim 5 wherein said weight lever has positioned proximate thereto holding means to prevent premature movement of said weight lever.

9. A tensile testing machine as defined in claim 7 wherein said weight lever return means comprises an air cylinder having a piston and rod slidably received therein, said rod being attached to said weight lever at its outer end.

10. A tensile testing machine as defined in claim 1 wherein said rotatable force indicator means comprises a second shaft journaled for rotation adjacent said weighted pendulum shaft means, said second shaft having a force indicator dial mounted at one end thereof, said dial having stationary pointer means associated therewith.

11. A tensile testing machine as defined in claim 10 wherein said second shaft has mounted thereon a gear and one way clutch means, said gear being in meshing relationship with the gear on said weighted shaft means and also associated with said one way clutch means, whereby said second shaft is rotated by rotation of said weighted shaft means in one direction only.

12. A tensile testing machine as defined in claim 8 wherein said holding means is associated with said force applicator means so as to be deactivated as said force applicator means is activated to apply a force on a specimen.

13. A tensile testing machine as defined in claim 1 wherein said weighted pendulum shaft means comprises a shaft journaled for rotation above said specimen holding means, said shaft having mounted thereon a gear, a drum and a yoke, said drum having a chain secured thereto and depending therefrom, said chain being connected to a rod and said rod being connected to said specimen holding means, said yoke having a weight lever attached thereto and extending therefrom; and wherein said rotatable force indicator means comprises a second shaft journaled for rotation adjacent said weighted shaft means, said second shaft having a gear rotatably mounted thereon and one way clutch means mounted thereon and associated with said gear, said gear being in meshing relationship with the gear on said weighted shaft means, said second shaft further having a force indicator dial at one end thereof, said dial having stationary pointer means associated therewith.

* * * * *